(12) United States Patent
Nitta et al.

(10) Patent No.: US 9,899,113 B2
(45) Date of Patent: Feb. 20, 2018

(54) PRODUCTION METHOD OF SCINTILLATOR DUAL ARRAY

(71) Applicant: HITACHI METALS, LTD., Minato-ku, Tokyo (JP)

(72) Inventors: Hideo Nitta, Mishima-gun (JP); Akira Shigekawa, Mishima-gun (JP); Satoshi Shiota, Mishima-gun (JP); Hiroyuki Nagatomo, Mishima-gun (JP)

(73) Assignee: HITACHI METALS, LTD., Tokyo (JP)

( * ) Notice: Subject to any disclaimer, the term of this patent is extended or adjusted under 35 U.S.C. 154(b) by 645 days.

(21) Appl. No.: 14/378,873

(22) PCT Filed: Mar. 7, 2013

(86) PCT No.: PCT/JP2013/056290
§ 371 (c)(1),
(2) Date: Aug. 14, 2014

(87) PCT Pub. No.: WO2013/146167
PCT Pub. Date: Oct. 3, 2013

(65) Prior Publication Data
US 2015/0033541 A1  Feb. 5, 2015

(30) Foreign Application Priority Data
Mar. 30, 2012  (JP) .................. 2012-080291

(51) Int. Cl.
*G01T 1/20* (2006.01)
*G21K 4/00* (2006.01)
(Continued)

(52) U.S. Cl.
CPC ............ *G21K 4/00* (2013.01); *C09K 11/7774* (2013.01); *C09K 11/883* (2013.01); *G01T 1/20* (2013.01);
(Continued)

(58) Field of Classification Search
CPC ... G01T 1/2002; G01T 1/2008; G02B 6/0031; G21K 4/00; B29C 39/10
See application file for complete search history.

(56) References Cited

U.S. PATENT DOCUMENTS 5,831,269 A * 11/1998 Nakamura ............ G01T 1/2018
250/367
6,344,649 B2 * 2/2002 Riedner ................. G01N 23/04
250/367
(Continued)

FOREIGN PATENT DOCUMENTS

JP  63-113387 A  5/1988
JP  02-17489 A  1/1990
(Continued)

OTHER PUBLICATIONS

International Search Report of PCT/JP2013/056290 dated Jun. 11, 2013.

*Primary Examiner* — Jason L Vaughan
*Assistant Examiner* — Amanda Meneghini
(74) *Attorney, Agent, or Firm* — Sughrue Mion, PLLC

(57) ABSTRACT

A method for producing a scintillator dual array comprising the steps of bonding first and second scintillator bar arrays having different sensitivity distributions of X-ray energy detection and pluralities of parallel grooves with equal gaps, via an intermediate resin layer, such that both scintillator bars are aligned in a lamination direction, cutting the integrally bonded bar array in a direction crossing the scintillator bars, and coating one cut surface of each bonded bar array piece with a resin.

12 Claims, 16 Drawing Sheets

(51) Int. Cl.
*C09K 11/77* (2006.01)
*C09K 11/88* (2006.01)

(52) U.S. Cl.
CPC ....... *G01T 1/2008* (2013.01); *Y10T 29/49888* (2015.01)

(56) References Cited

U.S. PATENT DOCUMENTS

| | | | | |
|---|---|---|---|---|
| 6,749,761 | B1* | 6/2004 | Andreaco | G01T 1/202 216/24 |
| 6,838,674 | B2* | 1/2005 | Otto | G01T 1/2928 250/361 R |
| 7,932,499 | B2* | 4/2011 | Furuichi | G01T 1/2002 250/366 |
| 7,968,853 | B2* | 6/2011 | Altman | A61B 6/032 250/366 |
| 8,963,097 | B2* | 2/2015 | Levene | G01T 1/2002 156/247 |
| 2003/0178570 | A1* | 9/2003 | Tsunota | G01T 1/2002 250/370.11 |
| 2007/0235654 | A1 | 10/2007 | Yahata et al. | |
| 2009/0173885 | A1 | 7/2009 | Zeitler et al. | |
| 2010/0220833 | A1 | 9/2010 | Levene et al. | |

FOREIGN PATENT DOCUMENTS

| | | |
|---|---|---|
| JP | 05-19060 A | 1/1993 |
| JP | 08-233942 A | 9/1996 |
| JP | 09-211139 A | 8/1997 |
| JP | 2000-180555 A | 6/2000 |
| JP | 2001-174564 A | 6/2001 |
| JP | 2006-145431 A | 6/2006 |
| JP | 2008-538966 A | 11/2008 |
| JP | 2009-524015 A | 6/2009 |
| JP | 2010-127630 A | 6/2010 |
| WO | 2006/114715 A2 | 11/2006 |

* cited by examiner

Step A2

Step A3

Step A4

Step A7

Step a2

Step a3

Step a4

Step a5

Step a6

Step a7

Step A8

Step A9-2

Step A10

Step A11

Step A12

Step A3

Step a3

PRODUCTION METHOD OF SCINTILLATOR DUAL ARRAY

CROSS REFERENCE TO RELATED APPLICATIONS

This is a National Stage of International Application No. PCT/JP2013/056290 filed Mar. 7, 2013 (claiming priority based on Japanese Patent Application No. 2012-080291 filed Mar. 30, 2012), the contents of which are incorporated herein by reference in their entirety.

FIELD OF THE INVENTION

The present invention relates to a method for producing a scintillator dual array used in radiation detectors, etc. with high precision.

BACKGROUND OF THE INVENTION

One of radiographic inspection apparatuses is a computed tomography (CT) apparatus. The CT apparatus comprises an X-ray tube for radiating X-ray fan beams, and a radiation detector comprising a large number of radiation detection elements. The X-ray tube and the radiation detector are arranged oppositely to each other with an object to be measured at a center. X-ray fan beams radiated from the X-ray tube pass through the object to be measured, and are detected by the radiation detector. With every radiation having a changed angle, X-ray absorption data are collected to calculate X-ray absorbance at each position in each cross section of the object by computer analysis, thereby forming an image based on the X-ray absorbance. The radiation detector may be a detector comprising a combination of a scintillator array and silicon photodiodes, or a detector comprising a scintillator array and photomultiplier tubes.

JP 2001-174564 A discloses an X-ray detector array comprising two types of scintillator elements arranged in an X-ray-transmitting direction for detecting X-rays with different energy distributions, and light-detecting elements each corresponding to each scintillator element arranged in a direction perpendicular to the scintillator elements, pluralities of scintillator elements and pluralities of light-detecting elements being aligned in line. Pluralities of scintillator elements are integrally molded by a light-reflecting material in a two-dimensional matrix pattern. JP 2001-174564 A illustrates an example in which three-stage scintillator elements are arranged in an X-ray-transmitting direction a direction). However, JP 2001-174564 A fails to specifically disclose the production method of the X-ray detector array.

As a dual energy detector comprising two types of scintillators with different sensitivity distributions of X-ray energy detection, WO 2006/114715 (JP 2008-538966 A) discloses a radiation detector comprising upper scintillators arranged opposite to an X-ray source for receiving radiations and converting low-energy radiations to light while permitting high-energy radiations to transmit, first light detectors each receiving the light from each upper scintillator for converting it to electric signals, lower scintillators for converting the transmitted high-energy radiations to light, and second light detectors each receiving the light from each lower scintillator for converting it to electric signals. However, WO 2006/114715 fails to specifically disclose the production method of a scintillator array.

JP 9-211139 A discloses a radiation detector comprising scintillators capable of emitting light by receiving radiations, and light detectors each converting the light from each scintillator to electric signals, the scintillators being a combination of ceramic scintillators and single-crystal scintillators. The ceramic scintillators are polycrystalline $Gd_2O_2S$:Pr, etc., and the single-crystal scintillators are $CdWO_4$, $Bi_6Ge_4O_{12}$, etc. In Examples, after the ceramic scintillators and the single-crystal scintillators are bonded with an epoxy adhesive, photodiodes are bonded to the single-crystal scintillator, and a light-reflecting $TiO_2$ layer is formed on the top surfaces of the ceramic scintillators. However, the production method of such scintillator suffers large numbers of steps.

OBJECT OF THE INVENTION

Accordingly, an object of the present invention is to provide a method for efficiently producing a scintillator dual array with high precision.

SUMMARY OF THE INVENTION

The method of the present invention for producing a scintillator dual array comprises the steps of bonding a first scintillator bar array comprising pluralities of first scintillator bars arranged via parallel grooves and a hardened reflecting resin filling the grooves, to a second scintillator bar array comprising pluralities of second scintillator bars arranged via parallel grooves and a hardened reflecting resin filling the grooves, via an intermediate resin layer, thereby aligning both scintillator bars in a lamination direction;

cutting the integrally bonded bar array in an arranging direction of the first and second scintillator bars; and coating one cut surface of each of the resultant bonded bar array pieces with a reflecting resin;

the first and second scintillator bars having the same pitch; and the first and second scintillator bars having different sensitivity distributions of X-ray energy detection.

The first and second scintillator bar arrays are preferably bonded after the intermediate resin layer is formed on either one of them.

It is preferable that the first scintillator bar array is formed by forming pluralities of parallel grooves in the first scintillator substrate fixed to a support plate, filling the grooves with a light-reflecting, hardening resin, and grinding the first scintillator substrate to predetermined thickness, and that the second scintillator bar array is formed by forming pluralities of parallel grooves in the second scintillator substrate fixed to a support plate, filling the grooves with a light-reflecting, hardening resin, and grinding the second scintillator substrate to predetermined thickness.

The intermediate resin layer is preferably formed on one scintillator bar array by (a) a method of forming a frame surrounding a region for the intermediate layer, pouring a liquid hardening resin for the intermediate layer into the frame, and grinding the hardened resin to a predetermined thickness, (b) a method of forming a photoresist pattern surrounding a region for the intermediate layer by photolithography, pouring a liquid hardening resin into the photoresist pattern, and grinding the hardened resin to a predetermined thickness, or (c) a method of bonding a hard resin plate having a predetermined thickness for the intermediate layer.

Both scintillator bars are preferably aligned in a lamination direction by forming positioning grooves in both scintillator bar arrays, inserting pins into the positioning grooves of either lower one of the first and second scintillator bar arrays, and laminating the other scintillator bar array on the lower scintillator bar array, with the pins received in the positioning grooves of the other scintillator bar array.

Pluralities of bonded bar array pieces placed on a support plate with equal gaps are preferably coated with a liquid hardening resin, the resin being hardened to form a dual array assembly, and the dual array assembly being cut along resin layers between the bonded bar array pieces to obtain individual scintillator dual arrays.

In an embodiment of the present invention, (a) the first scintillator bar array is formed by fixing the first scintillator substrate to a support plate, providing the first scintillator substrate with pluralities of parallel grooves as deep as its thickness, coating the first scintillator substrate having penetrating grooves with a liquid hardening resin filling the penetrating grooves, hardening the resin, and grinding the first resin-hardened, grooved scintillator substrate to desired thickness; and (b) the second scintillator bar array is formed by fixing the second scintillator substrate to a support plate, providing the second scintillator substrate with pluralities of parallel grooves as deep as its thickness, coating the second scintillator substrate having penetrating grooves with a liquid hardening resin filling the penetrating grooves, hardening the resin, and grinding the second resin-hardened, grooved scintillator substrate to desired thickness.

In another embodiment of the present invention, (a) the first scintillator bar array is formed by fixing the first scintillator substrate to a support plate, providing the first scintillator substrate with pluralities of parallel grooves shallower than its thickness to form a first comb-shaped scintillator substrate comprising pluralities of parallel scintillator bars integral via connecting portions, coating the first comb-shaped scintillator substrate with a liquid hardening resin filling the grooves, hardening the resin, and grinding the first resin-hardened, comb-shaped scintillator substrate to desired thickness such that the connecting portions are removed; and (b) the second scintillator bar array is formed by fixing the second scintillator substrate to a support plate, providing the second scintillator substrate with pluralities of parallel grooves shallower than its thickness to form a second comb-shaped scintillator substrate comprising pluralities of parallel scintillator bars integral via connecting portions, coating the second comb-shaped scintillator substrate with a liquid hardening resin filling the grooves, hardening the resin, and grinding the second resin-hardened, comb-shaped scintillator substrate to desired thickness such that the connecting portions are removed.

DESCRIPTION OF THE PREFERRED EMBODIMENTS

The embodiments of the present invention will be explained in detail below referring to the attached drawings, without intention of restricting the present invention thereto.

Explanations of each embodiment are applicable to other embodiments, unless otherwise mentioned.

The present invention uses two scintillator substrates having different sensitivity distributions to the detection of X-ray energy. A first scintillator substrate having high detection sensitivity on the low energy side is preferably, for example, a yttrium-gadolinium-aluminum-gallium garnet (YGAG) scintillator having a composition of $(Y_{1-x}Gd_x)_{3+a}(Ga_uAl_{1-u})_{5-a}O_{12}$ (x=0.10-0.5, u=0.2-0.6, and a=−0.05 to 0.15), which is activated with rare earth elements such as Ce, Pr, etc., and a second scintillator substrate having high detection sensitivity on the high energy side is preferably, for example, a gadolinium oxysulfide (GOS) scintillator having a composition of $Gd_2O_2S$, which is activated with at least one selected from Pr, Ce and Tb. As the first scintillator substrate, ZnSe may be used in place of YGAG. Also, as the second scintillator substrate, GGAG may be used in place of GOS. GGAG has a main composition of, for example, $(Gd_{1-x}Lu_x)_{3+a}(Ga_uAl_{1-u})_{5-a}O_{12}$ (x=0-0.5, u=0.2-0.6, and a=−0.05 to 0.15), which is activated with at least one selected from Ce, Pr, etc. The production method of the present invention will be explained in detail below, taking a combination of a YGAG scintillator array and a GOS scintillator array for example, without intention of restricting the present invention to this combination.

[1] First Embodiment

Figure 1:
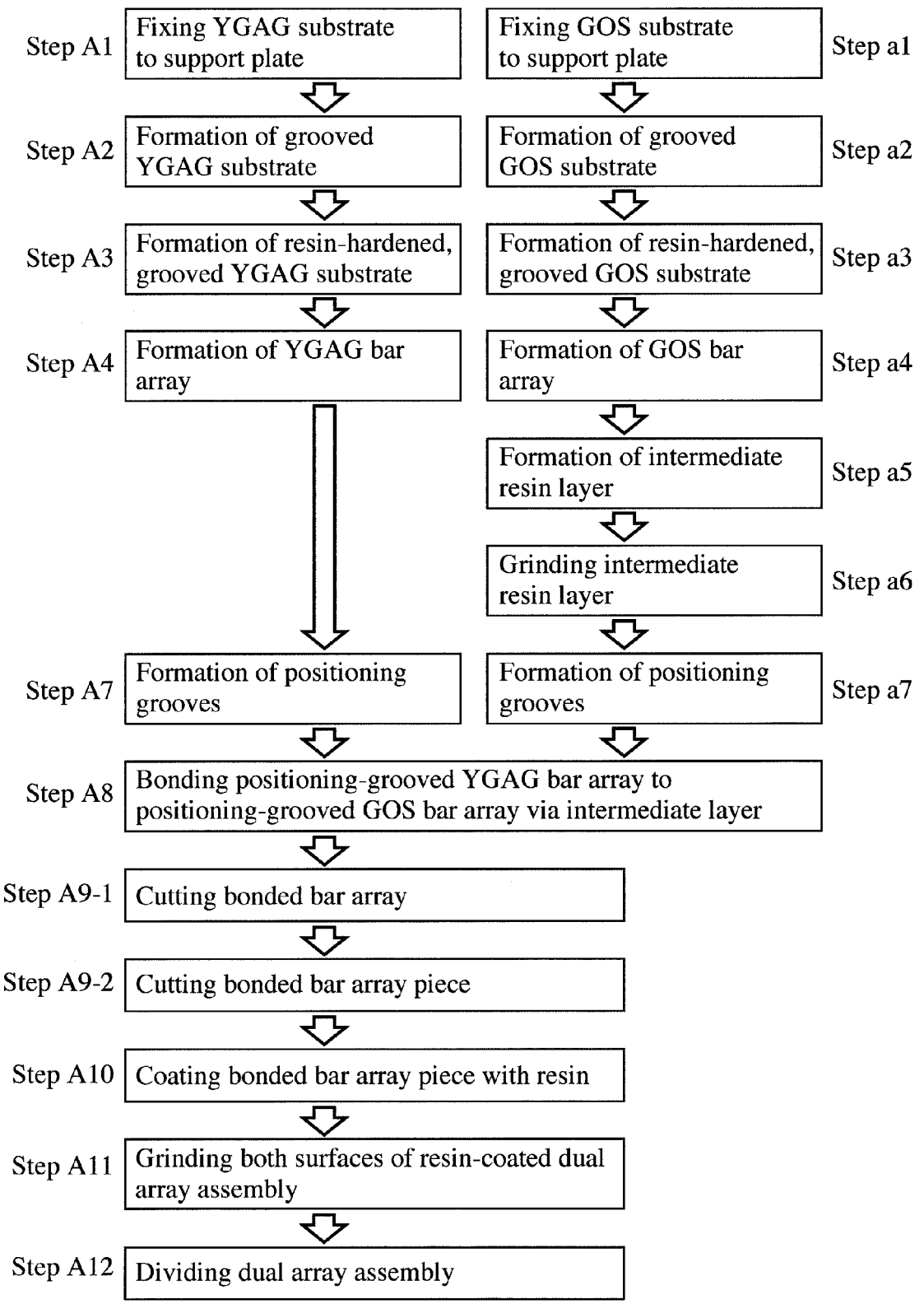
FIG. 1 is a flowchart showing a production method according to an embodiment of the present invention.
Figure 2:
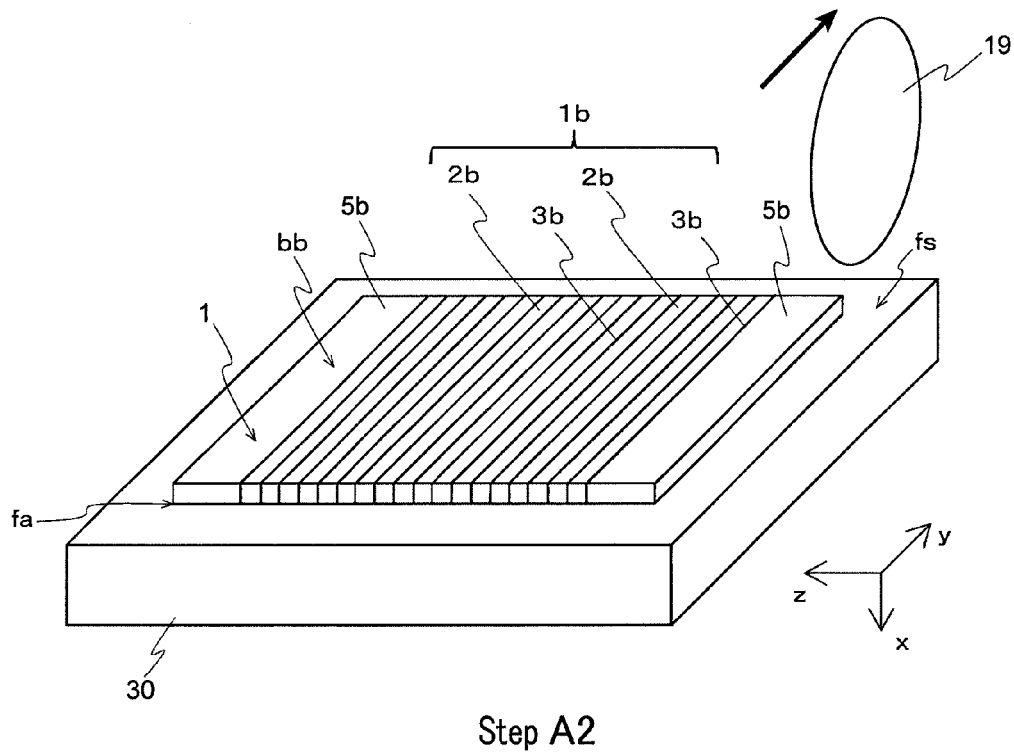
FIG. 2 is a perspective view showing a grooved YGAG substrate obtained in the step A2.

FIG. 1 is a flowchart showing a method for producing a scintillator dual array according to the first embodiment of the present invention. As shown in FIG. 2, as the first scintillator substrate, a rectangular plate-shaped YGAG substrate 1, which is made of a sintered scintillator having a composition of yttrium-gadolinium-aluminum-gallium garnet (YGAG) activated with a Ce element, is first fixed, with its front surface fa below, to a top surface fs of a first support plate 30 via an adhesive (not shown) (step A1). The adhesive is not particularly restricted, as long as it can keep the YGAG substrate 1 at a precise position in subsequent steps. The adhesive may be, for example, a double-coated adhesive film, a double-coated adhesive tape, etc. Among them, pressure-sensitive or heat-sensitive adhesives or double-coated adhesive films are preferable from the aspect of positioning precision and easiness of handling.

Using a rotating cutting grinder 19, pluralities of parallel grooves 3b penetrating from the rear surface bb to the adhesive are formed in the YGAG substrate 1, with both end portions 5b, 5b ungrooved. As shown in FIG. 2, the formation of the penetrating grooves 3b provides a grooved YGAG substrate 1b comprising pluralities of separate parallel YGAG bars 2b (step A2). Both end portions 5b, 5b of the grooved YGAG substrate 1b are cut off in a subsequent step A9 or A12. The x-axis, y-axis and z-axis shown in FIG. 2 respectively indicate the thickness direction of the YGAG substrate 1, the direction of grooves 3b and the arranging direction of the grooves 3b.

Figure 3:
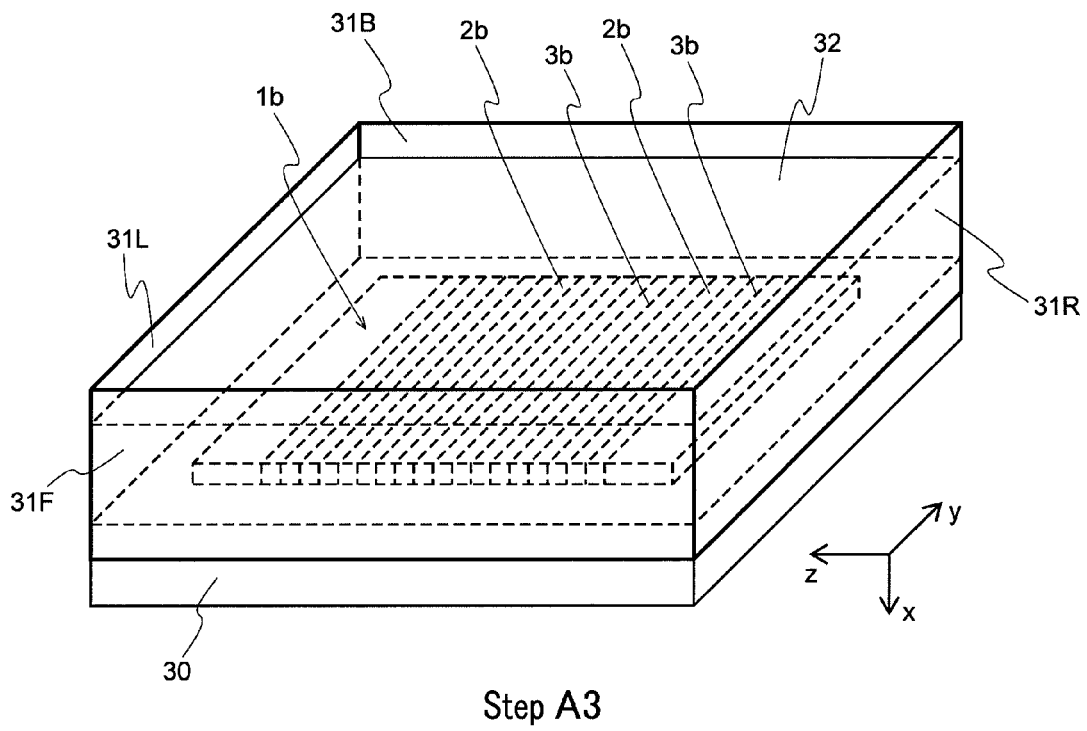
FIG. 3 is a perspective view showing the filling and curing of a resin in the step A3.

As shown in FIG. 3, films 31F, 31R, 31B, 31L for storing a liquid hardening resin are attached to side surfaces of the first support plate 30. Because the width of each film 31F, 31R, 31B, 31L is sufficiently larger than the height of the side surfaces of the first support plate 30, the films 31F, 31R, 31B, 31L projecting upward from the first support plate 30 constitute a space for storing the liquid hardening resin 32. Instead of using pluralities of films, one film bent along the side surfaces of the first support plate 30 may be used. As a liquid hardening resin 32 for forming a resin layer 3d (see FIG. 21) acting as a reflector when light is emitted from the YGAG cells, a liquid thermosetting epoxy resin containing, for example, white, fine titanium oxide particles is preferably used. The liquid hardening resin 32 introduced into the space flows into the penetrating grooves 3b of the grooved YGAG substrate 1b, and coats the upper and side surfaces of the grooved YGAG substrate 1b (step A3). By curing the liquid hardening resin 32, pluralities of YGAG bars 2b are bonded integrally.

Figure 4:
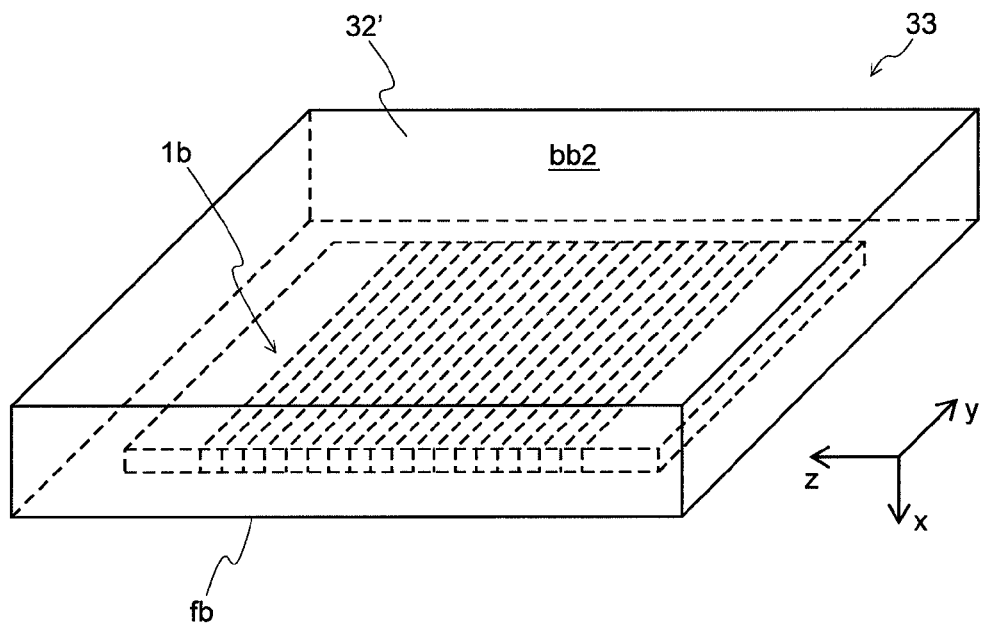
FIG. 4 is a perspective view showing a resin-hardened, grooved YGAG substrate obtained in the step A3.
Figure 5:
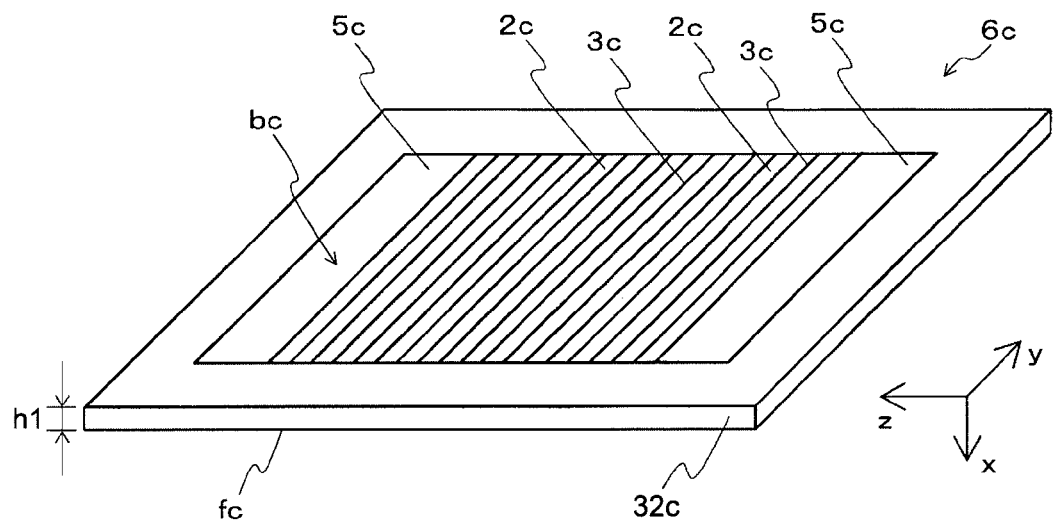
FIG. 5 is a perspective view showing a YGAG bar array obtained in the step A4.

As shown in FIG. 4, a resin-hardened, grooved YGAG substrate 33, in which the grooved YGAG substrate 1b is made integral with a hardened resin 32', is obtained by removing the films 31F, 31R, 31B, 31L and the first support plate 30. When the adhesive remains on the front surface fb of the resin-hardened, grooved YGAG substrate 33, it is removed by a stripping solution, grinding or polishing. By grinding the rear surface bb2 of the resin-hardened, grooved YGAG substrate 33 to expose the grooved YGAG substrate 1b, a YGAG bar array 6c having uniform thickness h1 is obtained as shown in FIG. 5 (step A4). Reference numerals assigned to members in the YGAG bar array 6c corresponding to those constituting the resin-hardened, grooved YGAG substrate 33 are provided with "c" in place of "b" after the same numbers. When the grooved YGAG substrate 1b is kept having a desired thickness h1, for example, as in a case where the adhesive is removed by a stripping solution, a resin layer having thickness α may remain after grinding the rear surface bb2, such that the YGAG bar array 6c has thickness h1+α. In the YGAG bar array 6c, a resin layer 32c is formed around the YGAG bars 2c.

Figure 6:
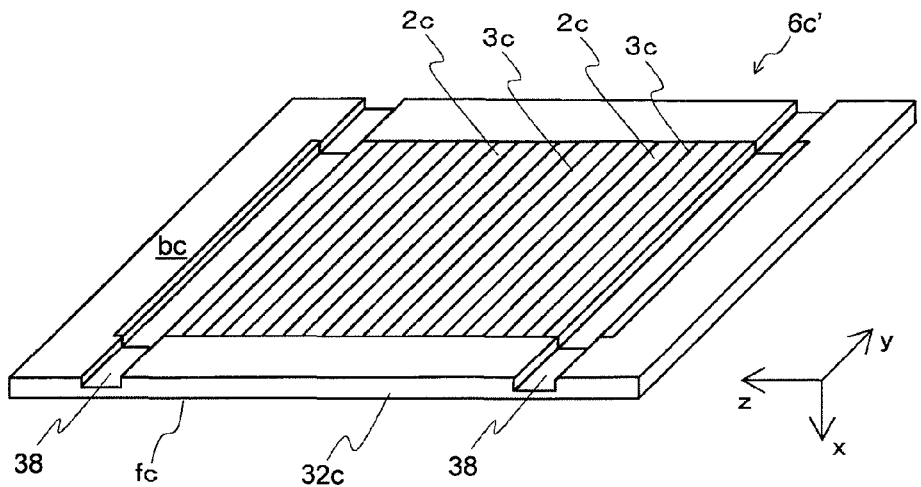
FIG. 6 is a perspective view showing a positioning-grooved YGAG bar array obtained in the step A7.

As shown in FIG. 6, a positioning groove 38 is formed in each end portion 5c of the YGAG bar array 6c on the side of the rear surface be by grinding in a y-axis direction, providing a YGAG bar array 6c' having positioning grooves (step A7). When the resin layer having thickness α is left, the positioning grooves 38, 38 are formed on the front surface fc.

As the second scintillator substrate, a rectangular plate-shaped GOS substrate 10 formed by a sintered scintillator having a composition of gadolinium oxysulfide (GOS) activated with Pr and Ce is produced. The GOS substrate 10 is thicker than the YGAG substrate 1. The GOS substrate 10 is fixed, with its front surface Fa on the lower side, to a top surface Fs of a second support plate 40 via an adhesive (not shown) (step a1). The adhesive may be the same as used for fixing the YGAG substrate 1.

Figure 7:
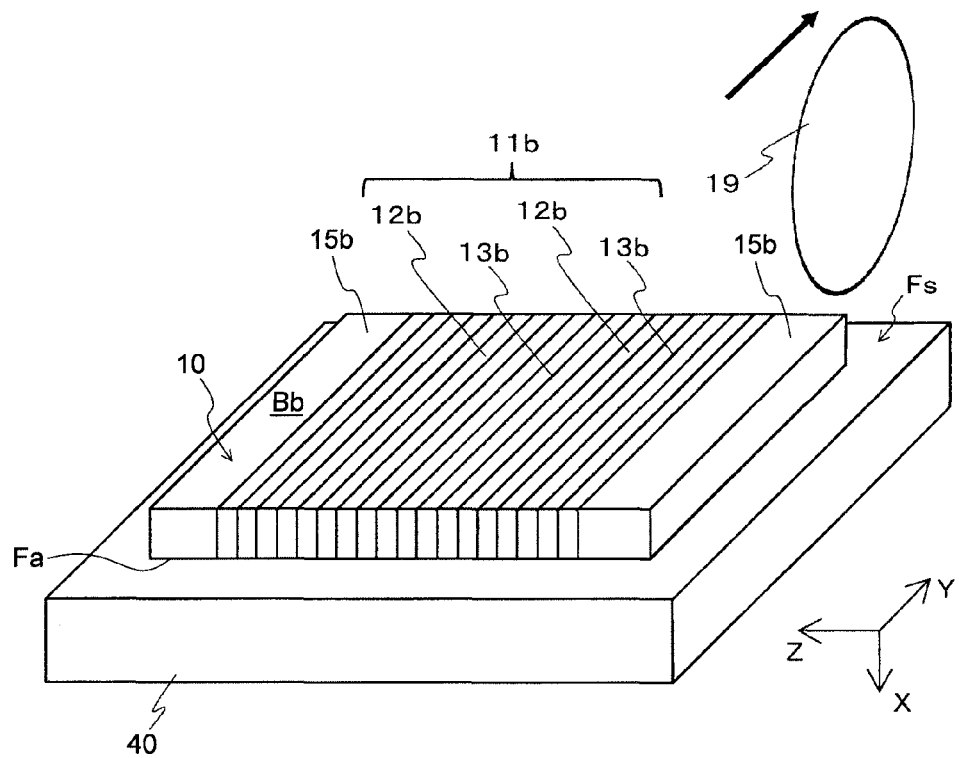
FIG. 7 is a perspective view showing a grooved GOS substrate obtained in the step a2.

Using a rotating cutting grinder 19, pluralities of parallel grooves 13b penetrating from the rear surface Bb to the adhesive are formed in the GOS substrate 10, with both end portions 15b, 15b ungrooved. As shown in FIG. 7, the formation of the penetrating grooves 13b provides a grooved GOS substrate 11b comprising pluralities of separate parallel GOS bars 12b (step a2). The width and pitch of the GOS bars 12b are the same as those of the YGAG bars 2b. Both end portions 15b, 15b of the grooved GOS substrate 11b are cut off in a subsequent step A9 or A12. The x-axis, y-axis and z-axis shown in FIG. 7 respectively indicate the thickness direction of the GOS substrate 10, the direction of the grooves 13b and the arranging direction of the grooves 13b.

Figure 8:
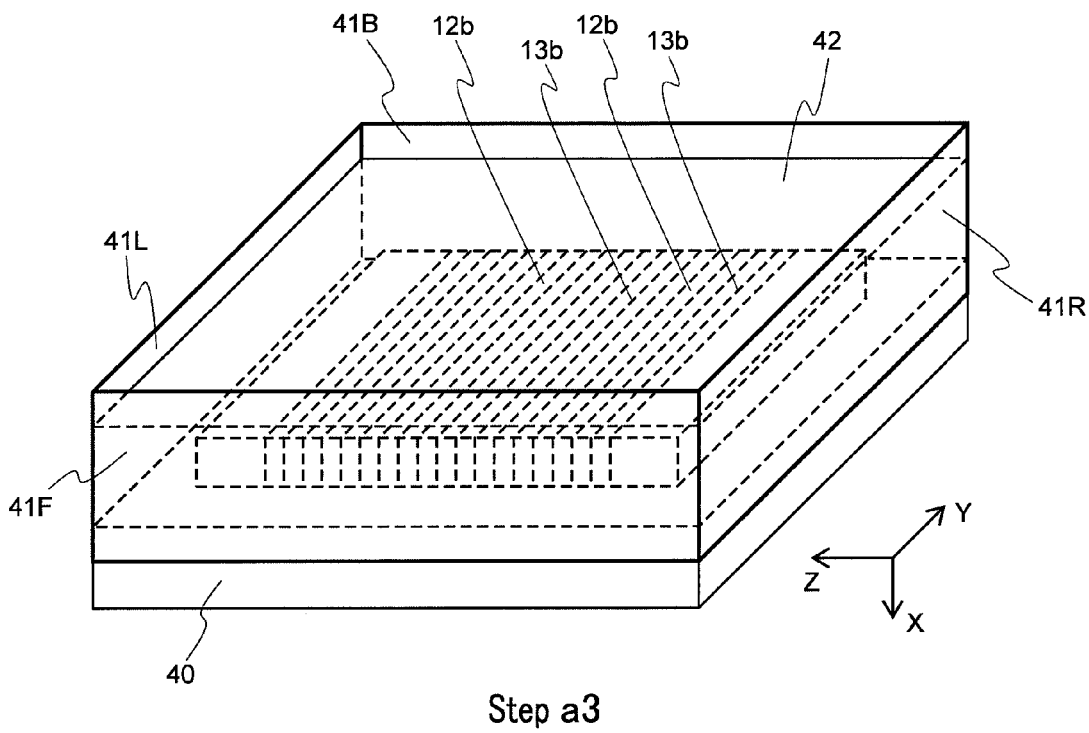
FIG. 8 is a perspective view showing the filling and curing of a resin in the step a3.

As shown in FIG. 8, films 41F, 41R, 41B, 41L for storing a liquid hardening resin are attached to the side surfaces of the second support plate 40. Because the width of each film 41F, 41R, 41B, 41L is sufficiently larger than the height of the side surfaces of the second support plate 40, the films 41F, 41R, 41B, 41L projecting upward from the second support plate 40 constitute a space for storing the liquid hardening resin 42. Instead of using pluralities of films, one film bent along the side surfaces of the second support plate

40 may be used. The liquid hardening resin 42 for forming a resin layer 13*d* (see FIG. 21) acting as a reflector when light is emitted from the GOS cells may be the same as the liquid hardening resin 32 used for forming the grooved YGAG substrate 1*b*. The liquid hardening resin 42 introduced into the space enters the penetrating grooves 13*b* of the grooved GOS substrate 11*b*, and coats the upper and side surfaces of the grooved GOS substrate 11*b* (step a3). With the liquid hardening resin 42 cured, pluralities of GOS bars 12*b* are integrally bonded.

Figure 9:
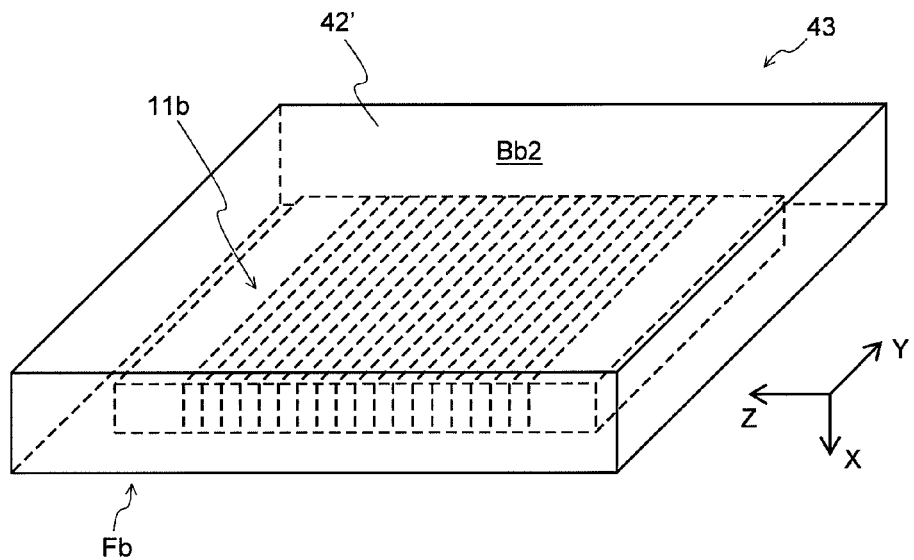
FIG. 9 is a perspective view showing a resin-hardened, grooved GOS substrate obtained in the step a3.
Figure 10:
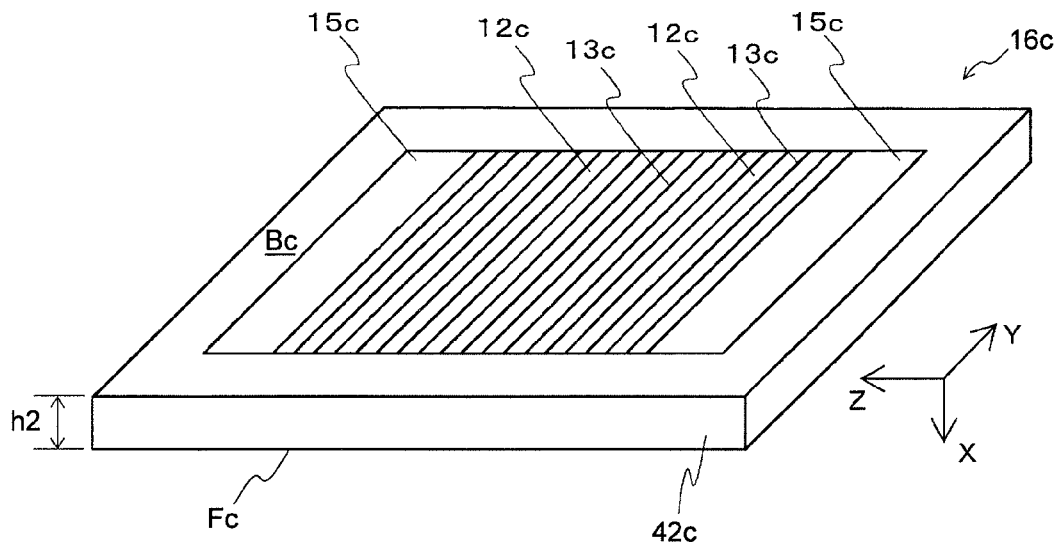
FIG. 10 is a perspective view showing a GOS bar array obtained in the step a4.

As shown in FIG. 9, the resin-hardened, grooved GOS substrate 43, in which the grooved GOS substrate 11*b* are made integral with the hardened resin 42', is obtained by removing the film 41F, 41R, 41B, 41L and the second support plate 40. When the adhesive remains on the front surface Fb of the resin-hardened, grooved GOS substrate 43, it is removed by a stripping solution, grinding or polishing. By grinding the rear surface Bb2 of the resin-hardened, grooved GOS substrate 43 to expose the grooved GOS substrate 11*b*, a GOS bar array 16*c* having uniform thickness h2 is obtained as shown in FIG. 10 (step a4). Reference numerals assigned to members in the GOS bar array 16*c* corresponding to those constituting the resin-hardened, grooved GOS substrate 43 are provided with "c" in place of "b" after the same numbers. When the GOS bar array is kept having a desired thickness h2, for example, as in a case where the adhesive is removed by a stripping solution, the resin layer having thickness α may remain after grinding the rear surface Bb2, such that GOS bar array 16*c* has thickness of (h2+α). In the GOS bar array 16*c*, a resin layer 42*c* is formed around the GOS bars 12*c*.

Figure 11A:
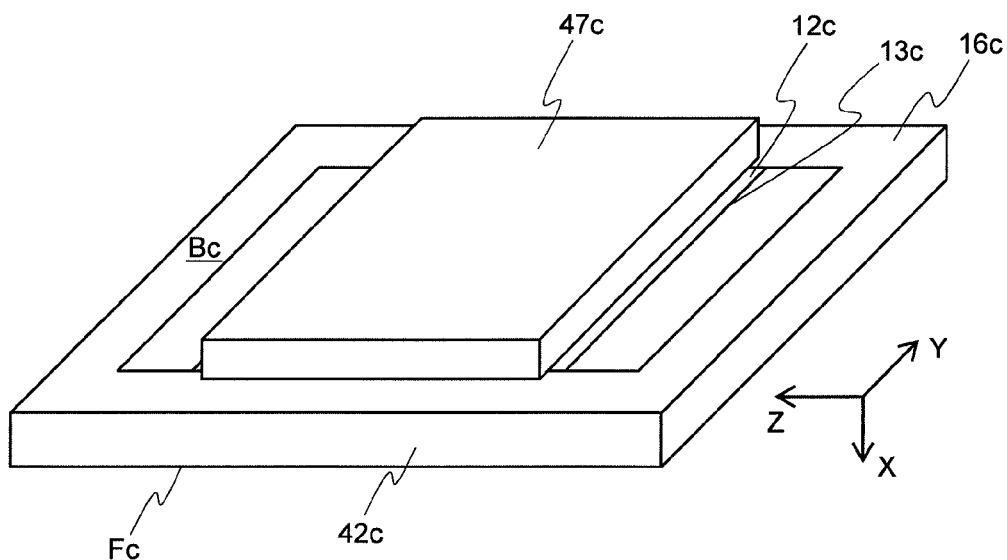
FIG. 11(a) is a perspective view showing a GOS bar array provided with an intermediate resin layer in the step a5.
Figure 11B:
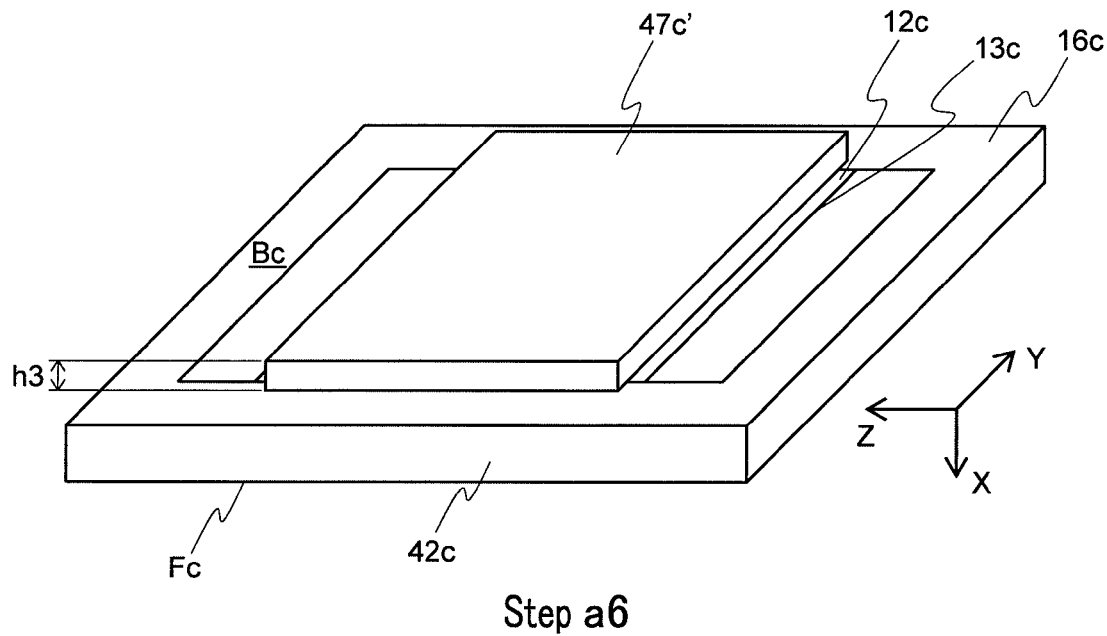
FIG. 11(b) is a perspective view showing a GOS bar array having an intermediate resin layer ground to a uniform thickness in the step a6.

As shown in FIG. 11(*a*), an intermediate resin layer 47*c* is formed on the rear surface Bc of the GOS bar array 16*c* (step a5). The intermediate resin layer 47*c* is preferably made of a liquid thermosetting epoxy resin containing titanium oxide ($TiO_2$). As shown in FIG. 11(*b*), the resin layer 47*c* is ground to form an intermediate resin layer 47*c'* having uniform thickness h3 (step a6). The intermediate resin layer may be formed by (a) a method of forming a frame surrounding a region for the intermediate layer by an adhesive tape, etc., pouring a liquid hardening resin for the intermediate layer into the frame, and grinding the hardened resin layer to a predetermined thickness h3, (b) a method of forming a photoresist pattern surrounding a region for the intermediate layer by photolithography, forming a liquid hardening resin layer in the photoresist pattern by a bar coater, a spin coater, a spray coater, etc., and grinding the hardened resin layer to a predetermined thickness h3, (c) a method of adhering a hard resin plate for the intermediate layer having a predetermined size (thickness: h3) to the rear surface Bc of the GOS bar array 16*c*, etc.

Figure 12:
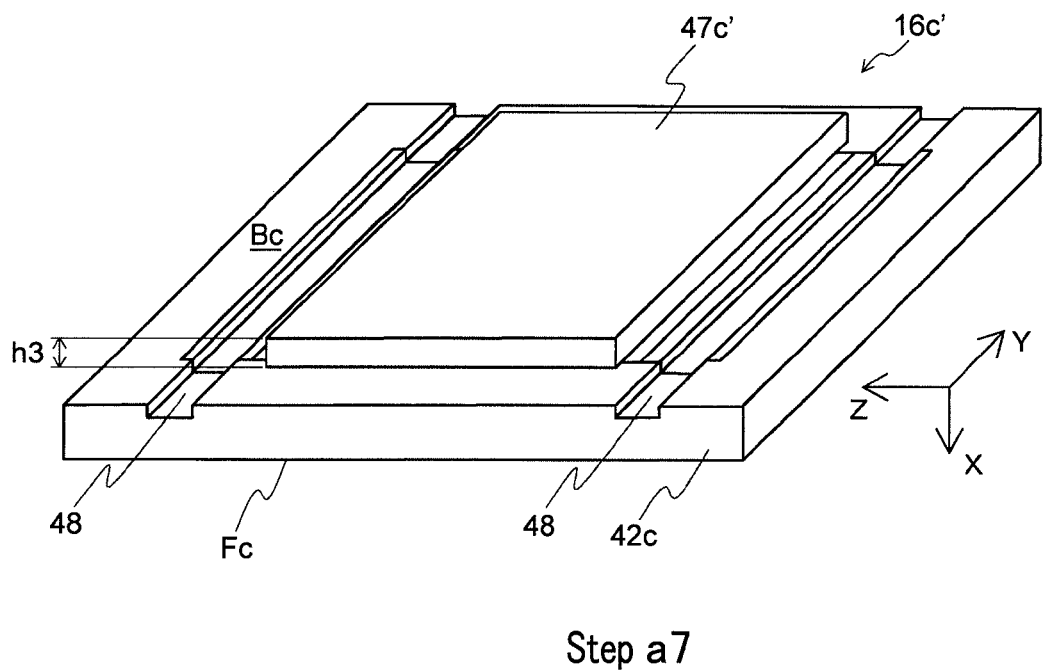
FIG. 12 is a perspective view showing a positioning-grooved GOS bar array obtained in the step a7.

As shown in FIG. 12, positioning grooves 48, 48 are formed by grinding in a Y-axis direction in end portions 15*c*, 15*c* near both ends of the resin layer 47*c'* on the side of the rear surface Bc, providing a GOS bar array 16*c'* having positioning grooves (step a7). The positions of both positioning grooves 38, 38 of the YGAG bar array 6*c'* and both positioning grooves 48, 48 of the GOS bar array 16*c'* are set, such that the YGAG bars 2*c* and the GOS bars 12*c* are in agreement with each other in pitch when they are overlapped via pins 39, 39 as described below. The order of the step a6 of forming the intermediate resin layer 47*c'* and the step a7 of forming the positioning grooves may be reversed.

The pins 39, 39 are arranged in the positioning grooves 48, 48 of the positioning-grooved GOS bar array 16*c'*, and fixed by an adhesive. The intermediate resin layer 47*c'* is thinly coated with a thermosetting adhesive. The amount of the thermosetting adhesive applied is set such that the total thickness of the cured adhesive and the intermediate resin layer 47*c'* is equal to a desired gap between the YGAG bars and the GOS bars. The thermoset adhesive is preferably the same as the intermediate resin layer 47*c'*.

Figure 13:
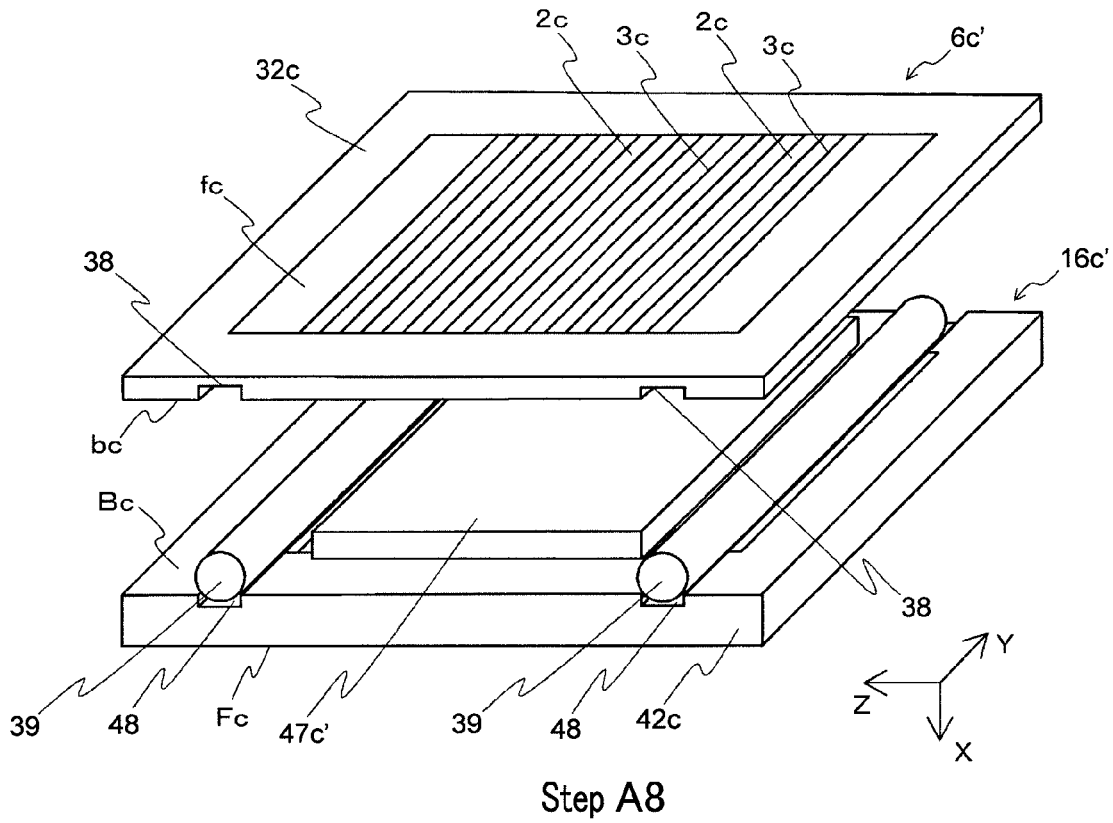
FIG. 13 is a perspective view showing a step A8 of adhering a positioning-grooved YGAG bar array to a positioning-grooved GOS bar array via an intermediate resin layer.

As shown in FIG. 13, with the positioning grooves 38, 38 in alignment with the pins 39, 39 fixed to positioning grooves 48, 48 of the positioning-grooved GOS bar array 16*c'*, the positioning-grooved YGAG bar array 6*c'* is bonded to the intermediate resin layer 47*c'* (step A8). The use of pins 39, 39 fitting in both positioning grooves 38, 38 and 48, 48 enables the precise positioning of the positioning-grooved YGAG bar array 6*c'* and the positioning-grooved GOS bar array 16*c'*. From the aspect of positioning precision, the pins 39, 39 preferably have such shape and size that they abut inner surfaces of both positioning grooves, for example, a circular cross section as shown in FIG. 13, and they are preferably round stainless steel rods having diameters of, for example, 0.2-1 mm.

Figure 14:
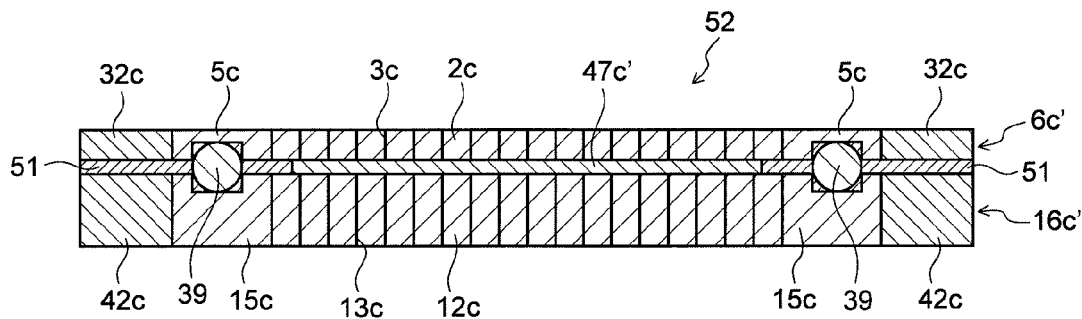
FIG. 14 is a cross-sectional view showing an integrally bonded bar array obtained in the step A8.

After bonding the positioning-grooved YGAG bar array 6*c'* to the positioning-grooved GOS bar array 16*c'* via the intermediate resin layer 47*c'*, the positioning-grooved YGAG bar array 6*c'* is pressed uniformly in an X-axis direction via a pressing plate (not shown), thereby fixing the rear surface be of the positioning-grooved YGAG bar array 6*c'* to the intermediate resin layer 47*c'*. After the thermosetting adhesive is cured, the pressing plate is removed to obtain a bonded bar array 52 shown in FIG. 14. In the bonded bar array 52, a gap between both positioning-grooved bar arrays 6*c'*, 16*c'* is filled with a resin 51, except for a region sandwiching the intermediate resin layer 47*c'*. The above positioning method provides high-precision positioning of both positioning-grooved bar arrays 6*c'*, 16*c'*, such that the YGAG bars 2*c* and the GOS bars 12*c* are precisely opposing each other via the intermediate resin layer 47*c'*.

Figure 15:
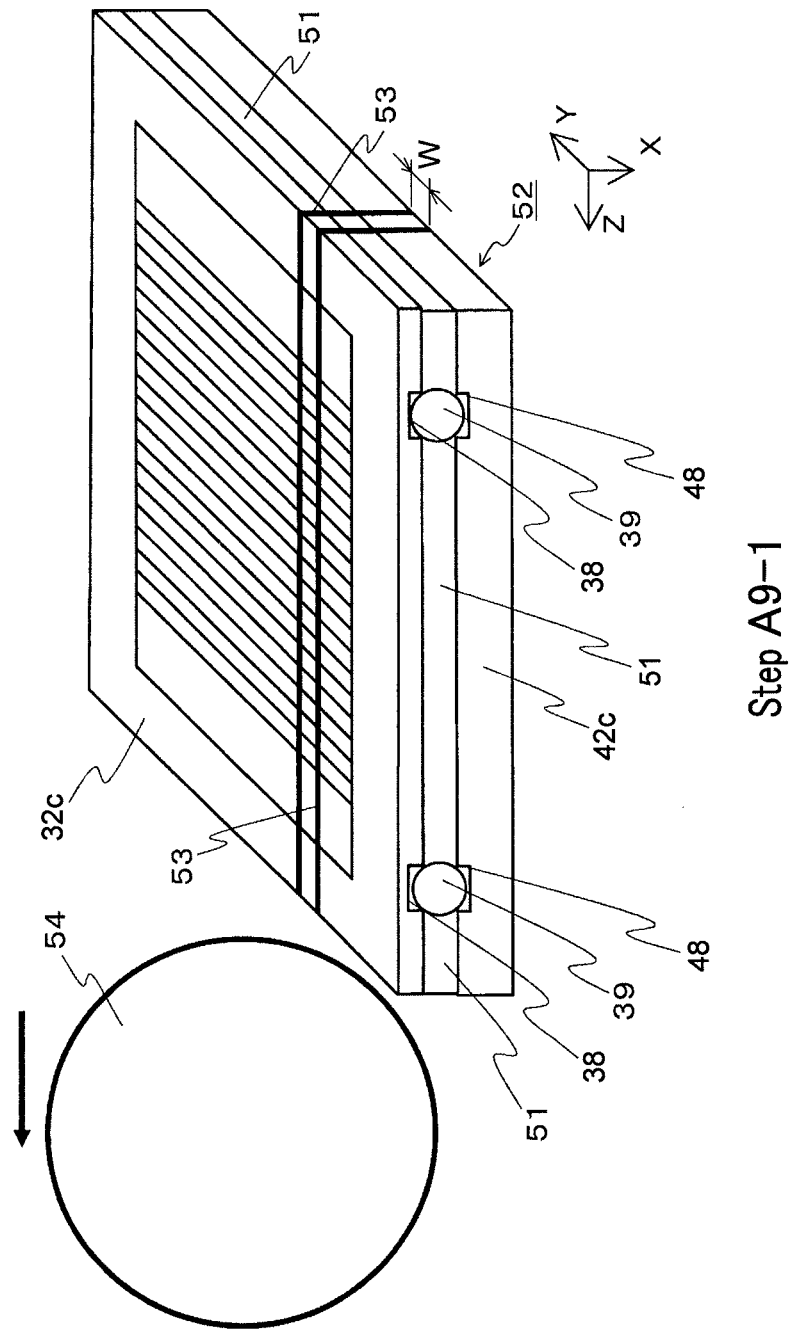
FIG. 15 is a perspective view showing a step A9-1 of cutting an integrally bonded bar array to a predetermined thickness by a rotating grinder.
Figure 16:
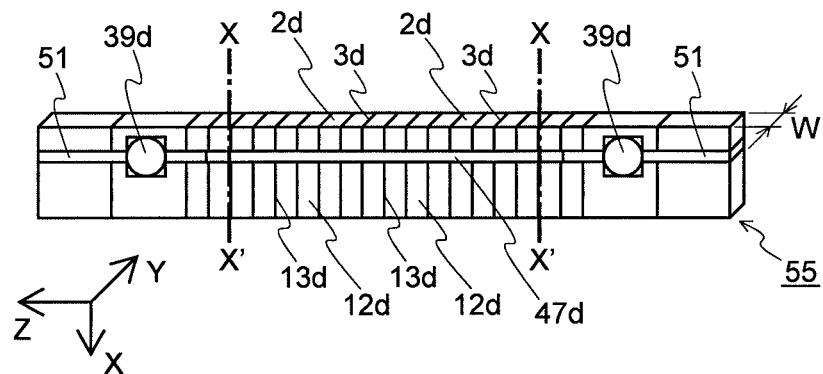
FIG. 16 is a perspective view showing a step A9-2 of cutting off Z-axis end portions from a bonded bar array piece obtained in the step A9-1.

By cutting the bonded bar array 52 to a predetermined width W in a Z-axis direction by a rotating grinder 54 as shown in FIG. 15 (step A9-1), pluralities of bonded bar array pieces 55 each having an intermediate layer 47*d* are obtained as shown in FIG. 16. Reference numerals assigned to members in the bonded bar array piece 55 corresponding to those constituting the bonded bar array 52 are provided with "d" in place of "c" after the same numbers.

Figure 17:
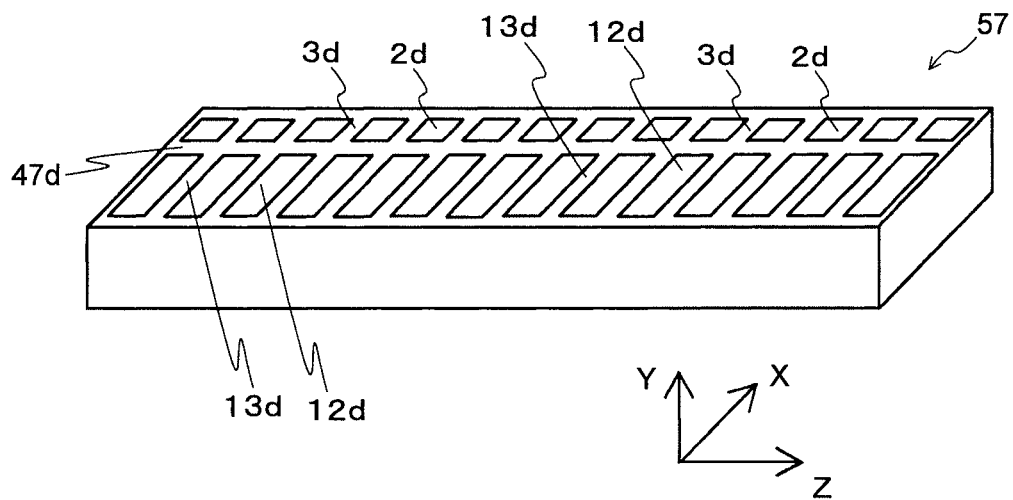
FIG. 17 is an enlarged perspective view showing an integrally bonded bar array piece, with Z-axis end portions cut off in the step A9-2.

Each bonded bar array piece 55 comprises a YGAG cell line comprising YGAG cells 2*d* and resin layers 3*d* arranged alternately in a Z-axis direction, a GOS cell line comprising GOS cells 12*d* and resin layers 13*d* arranged alternately in a Z-axis direction, and an intermediate resin layer 47*d* between both cell lines, the YGAG cells 2*d* and the GOS cells 12*d* being aligned in an X-axis direction. When each bonded bar array piece 55 is cut along straight lines X-X', X-X' as shown in FIG. 16 (step A9-2), Z-axis end portions are removed, resulting in a bonded bar array piece 57 comprising a YGAG cell line comprising YGAG cells 2*d* and resin layers 3*d*, an intermediate layer 47*d*, and a GOS cell line comprising GOS cells 12*d* and resin layers 13*d* as shown in FIG. 17. Though the Z-axis end portions have resin layers 3*d*, 13*d* in the depicted example, they may of course have YGAG cells 2*d* and GOS cells 12*d*.

Figure 18:
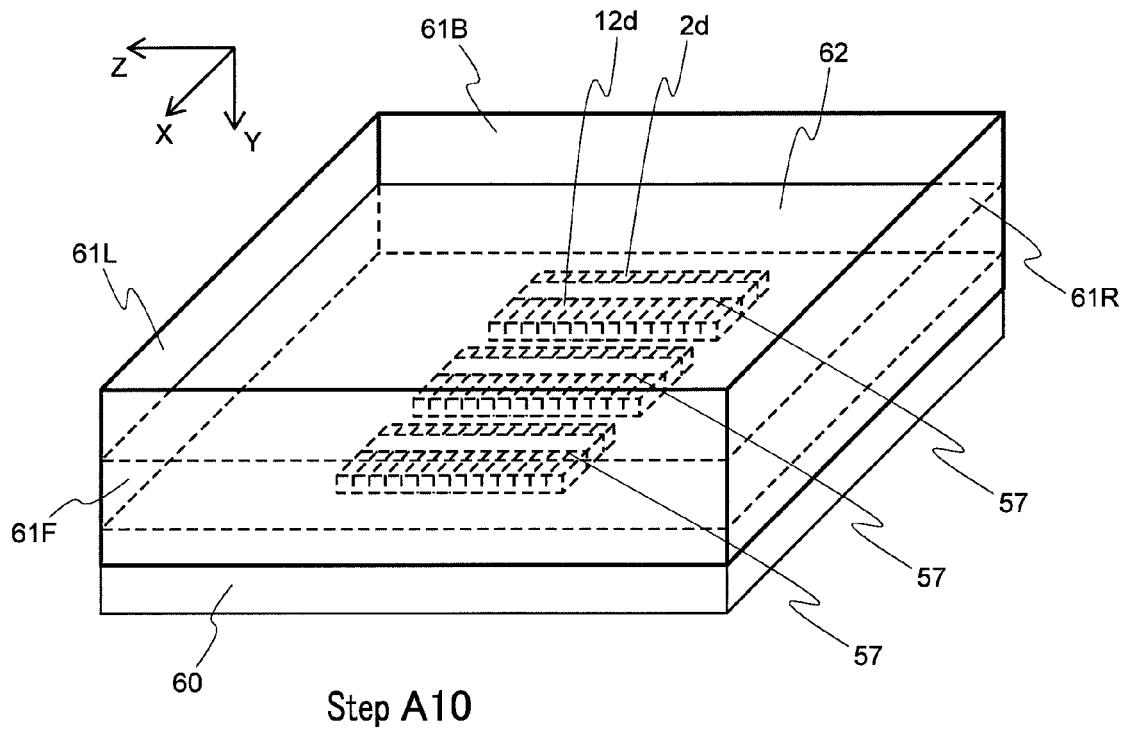
FIG. 18 is a perspective view showing a step A10 of coating the bonded bar array pieces with a resin.

As shown in FIG. 18, after pluralities of bonded bar array pieces 57 are placed on a third support plate 60 via an adhesive, films 61F, 61R, 61B, 61L for storing a liquid hardening resin are attached to side surfaces of the third support plate 60. Because the width of the films 61F, 61R, 61B, 61L is sufficiently larger than the height of the side surfaces of the third support plate 60, the film 61F, 61R, 61B, 61L projecting upward from the third support plate 60 constitute a space for storing a liquid hardening resin 62. Instead of using pluralities of films, one film bent along the side surfaces of the third support plate 60 may be used. The liquid hardening resin 62 may be the same as the liquid hardening resins 32, 42 used for forming the grooved YGAG substrate 1b and the grooved GOS substrate 11b. The liquid hardening resin 62 is charged into the space and cured (step A10). Thus, the bonded bar array pieces 57 are coated with a hardening resin 62 acting as reflectors of GOS cells 12d and YGAG cells 2d, except for a surface opposing the third support plate 60.

Figure 19:
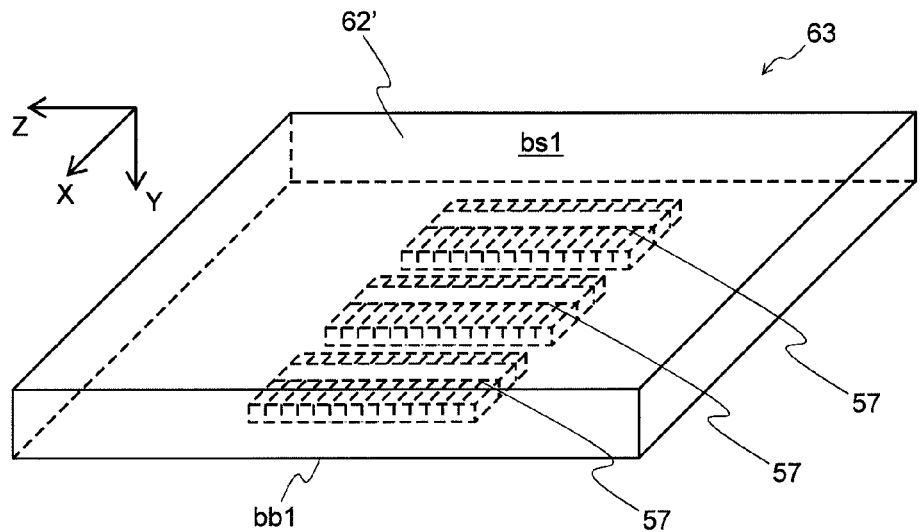
FIG. 19 is a perspective view showing a resin-coated dual array assembly obtained in the step A10.
Figure 20:
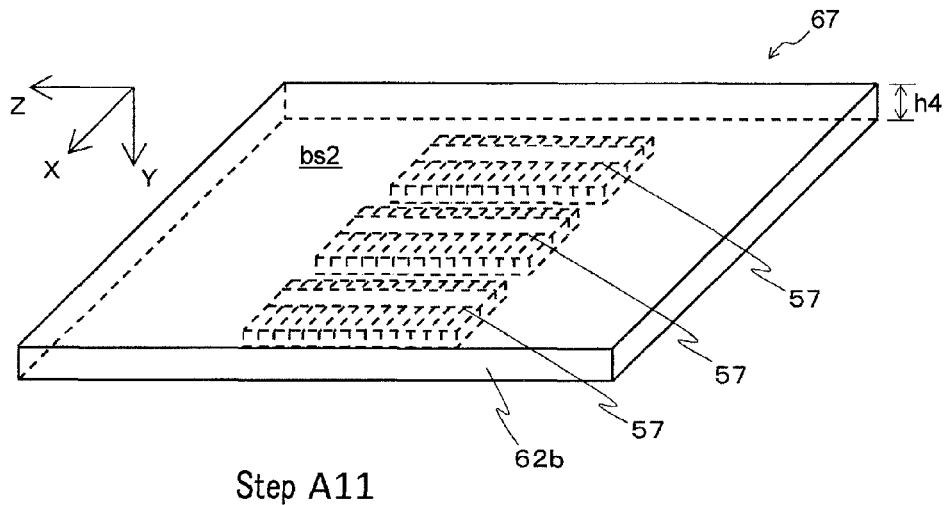
FIG. 20 is a perspective view showing a dual array assembly obtained in the step A11.

A resin-coated dual array assembly 63, in which pluralities of bonded bar array pieces 57 are made integral with a hardened resin 62' as shown in FIG. 19, is obtained by removing the films 61F, 61R, 61B, 61L and the third support plate 60 from the cured resin 62. When the adhesive remains on the front surface bb1 (on the side of the third support plate 60) of the resin-coated dual array assembly 63, it is removed by a stripping solution, grinding or polishing. The rear surface bs1 of the resin-coated dual array assembly 63 is then ground to obtain a dual array assembly 67 having desired uniform thickness h4 as shown in FIG. 20 (step A11).

Figure 21A:
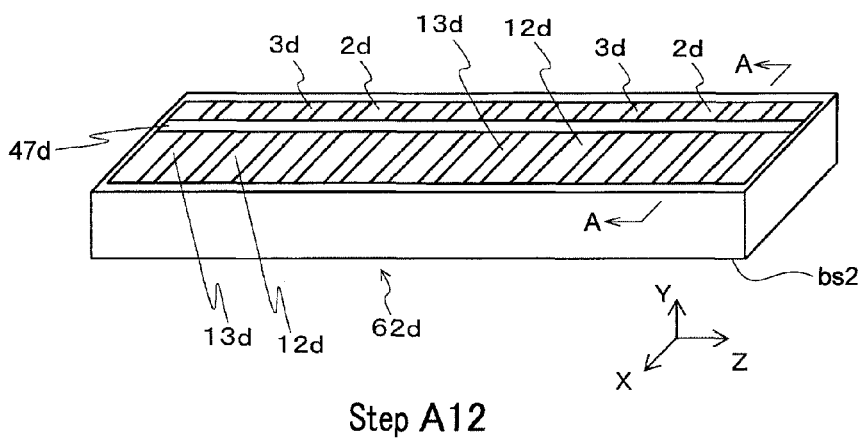
FIG. 21(a) is an enlarged perspective view showing a dual array obtained in the step A12.

The dual array assembly 67 is divided along a centerline of each resin layer between the bonded bar array pieces 57, to obtain dual arrays each having a GOS cell array and a YGAG cell array as shown in FIG. 21(a) (step A12). To achieve a predetermined size, the dual arrays may be machined on peripheries. This dual array comprises a YGAG cell line comprising YGAG cells 2d and resin layers 3d arranged alternately in a Z-axis direction, a GOS cell line comprising GOS cells 12d and resin layers 13d arranged alternately in a Z-axis direction, and an intermediate resin layer 47d between both cell lines, the YGAG cells 2d and the GOS cells 12d being aligned in an X-axis direction.

Figure 21B:
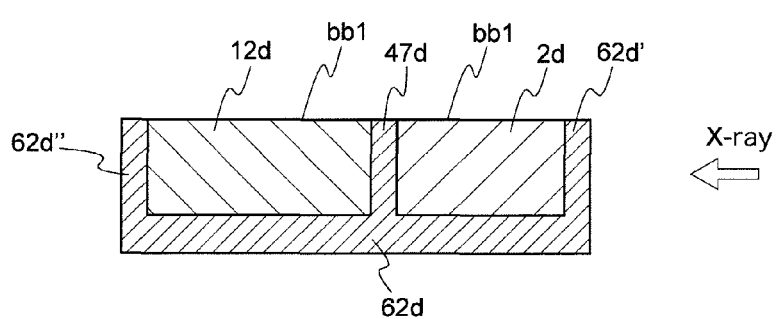
FIG. 21(b) is a cross-sectional view taken along the line A-A in FIG. 21(a).

As shown in FIG. 21(b), a resin layer surrounding the YGAG cells 2d and the GOS cells 12d is constituted by an intermediate layer 47d, a rear surface layer 62d, a side surface layer 62d' on the side of the YGAG cells 2d, and a side surface layer 62d" on the side of the GOS cells 12d. Any resin layer is made of a curable epoxy resin containing white fine titanium oxide particles. X-rays transmit the side surface layer 62d' and enter the YGAG cells 2d, which emits light. The intermediate layer 47d, the rear surface layer 62d and the side surface layer 62d' act as light-reflecting layers for reflecting light not only from the YGAG cells 2d but also from outside. X-rays further transmit the intermediate layer 47d, and are input to the GOS cells 12d with energy attenuated, so that the GOS cells 12d emit light. The YGAG cells 2d and the GOS cells 12d are exposed on the front surface bb1 of the dual array, so that light emitted from the YGAG cells 2d and the GOS cells 12d by X-rays is input to light-receiving elements (not shown) arranged opposite to the YGAG cells 2d and the GOS cells 12d.

[2] Second Embodiment

In the method for producing a scintillator dual array according to the second embodiment of the present invention, an intermediate layer is arranged on the side of a YGAG substrate. Except for this, the dual array can be produced by the same steps as in the first embodiment.

[3] Third Embodiment

The method for producing a scintillator dual array according to the third embodiment of the present invention is obtained by reversing the order of the step a6 of forming an intermediate resin layer and the step a7 of forming positioning grooves in the method of the first embodiment. Namely, in the method of the third embodiment, a step of forming positioning grooves is conducted after the step a5 of forming an intermediate resin layer, and a step of grinding an intermediate resin layer is then conducted. Except for this, it is the same as the method of the first embodiment.

[4] Fourth Embodiment

The method of the fourth embodiment is characterized by forming pluralities of parallel unpenetrating grooves in each scintillator substrate, coating the resultant comb-shaped scintillator substrate with a liquid hardening resin, hardening the liquid hardening resin, and grinding the resultant resin-hardened, comb-shaped scintillator substrate to a desired thickness such that the connecting portions are removed, thereby obtaining bar arrays. Because its subsequent steps are not different from those in the method of the first embodiment, steps up to the production of both bar arrays will be explained in detail below.

Figure 22:
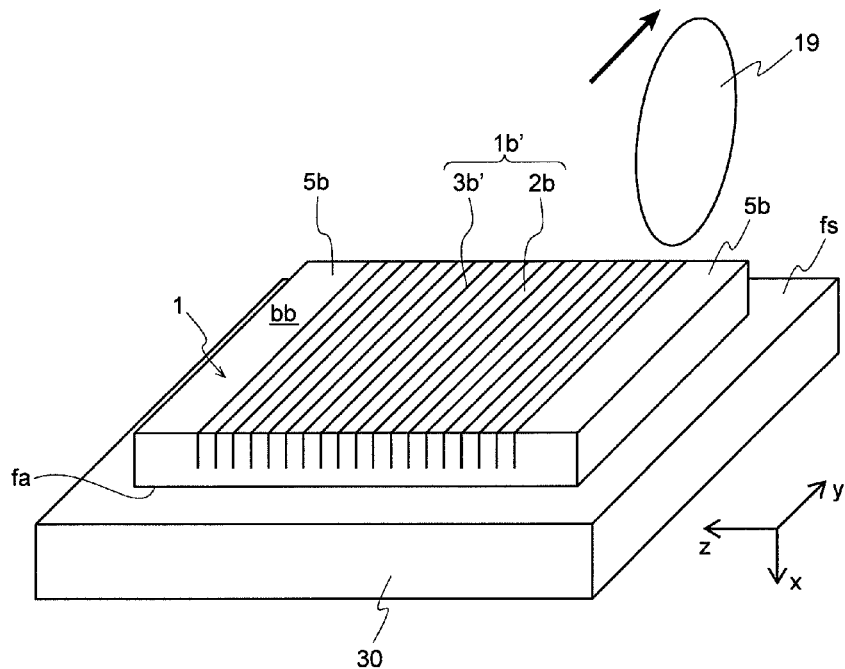
FIG. 22 is a perspective view showing the production of a comb-shaped YGAG substrate by forming unpenetrating grooves in a YGAG substrate fixed to a support plate, according to another embodiment of the present invention.

As shown in FIG. 22, a YGAG substrate 1 is fixed on the first support plate 30 via an adhesive (not shown), and pluralities of parallel grooves 3b' as deep as not reaching the adhesive are formed in the YGAG substrate 1 by a rotating cutting grinder 19, with both end portions 5b, 5b ungrooved. The formation of grooves 3b' provides a comb-shaped YGAG substrate 1b' comprising pluralities of parallel YGAG bars 2b and their connecting portions. Both end portions 5b, 5b of the comb-shaped YGAG substrate 1b' are cut off in a subsequent step A9 or A12.

Figure 23:
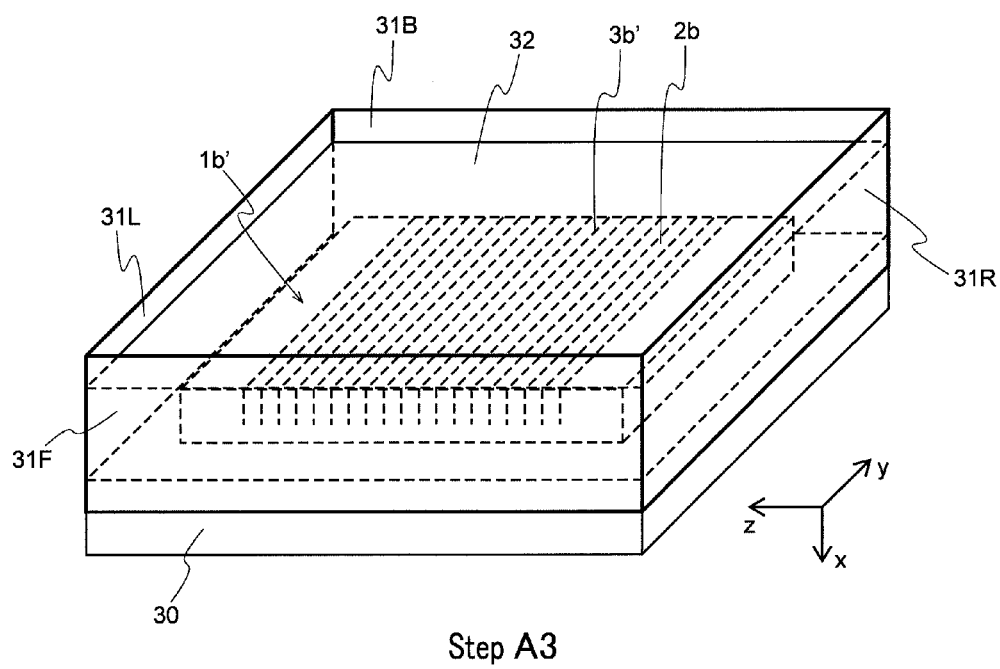
FIG. 23 is a perspective view showing the coating of a comb-shaped YGAG substrate having unpenetrating grooves with a resin.

As shown in FIG. 23, films 31F, 31R, 31B, 31L for storing a liquid hardening resin is attached to side surfaces of the first support plate 30, to form a space for storing the liquid hardening resin 32. The liquid hardening resin 32 poured into the space fill the grooves of the comb-shaped YGAG substrate 1b'. The hardening of the liquid hardening resin 32 makes pluralities of YGAG bars 2b integral with the hardened resin 32'.

Figure 24A:
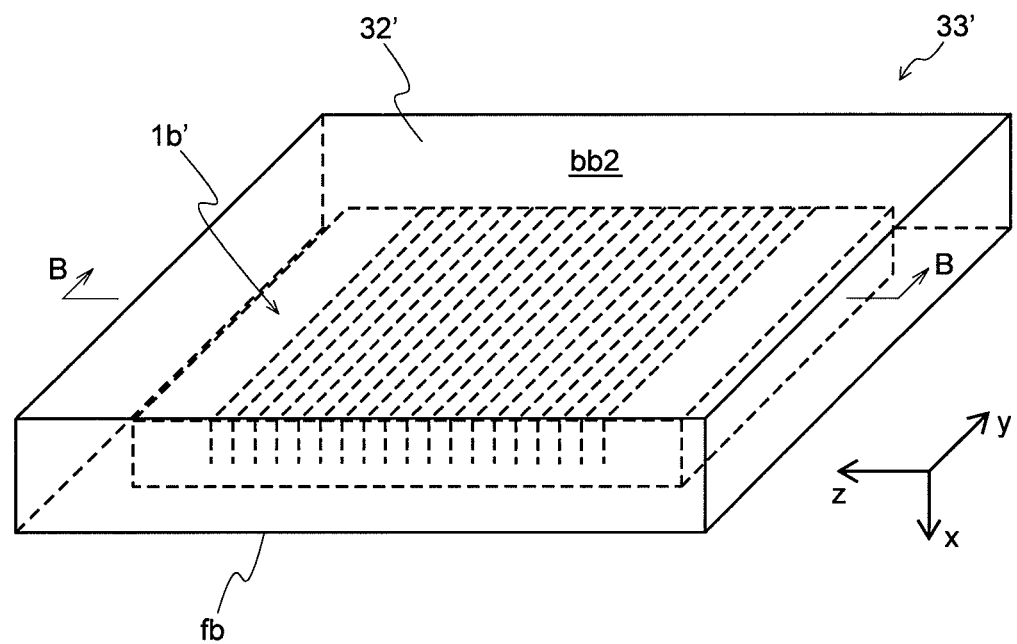
FIG. 24(a) is a perspective view showing a resin-hardened, comb-shaped YGAG substrate according to a further embodiment of the present invention.
Figure 24B:
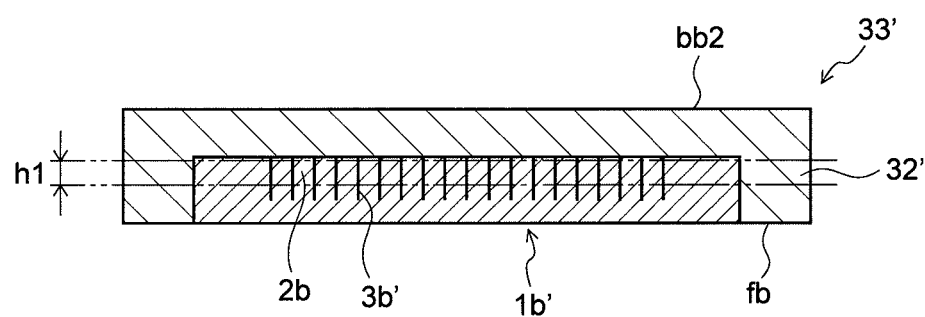
FIG. 24(b) is a cross-sectional view taken along the line B-B in FIG. 24(a).

A resin-hardened, comb-shaped YGAG substrate 33', in which the comb-shaped YGAG substrate 1b' is integral with the hardened resin 32' as shown in FIGS. 24(a) and 24(b), is obtained by removing the films 31F, 31R, 31B, 31L and the first support plate 30. As shown in FIG. 24(b), the front and rear surfaces fb, bb2 of the resin-hardened, comb-shaped YGAG substrate 33' are ground, to remove the connecting portions of the comb-shaped YGAG substrate 1b', and to expose the YGAG bars 2c on both surfaces as in FIG. 5, thereby providing a YGAG bar array 6c having a uniform thickness h1.

Figure 25:
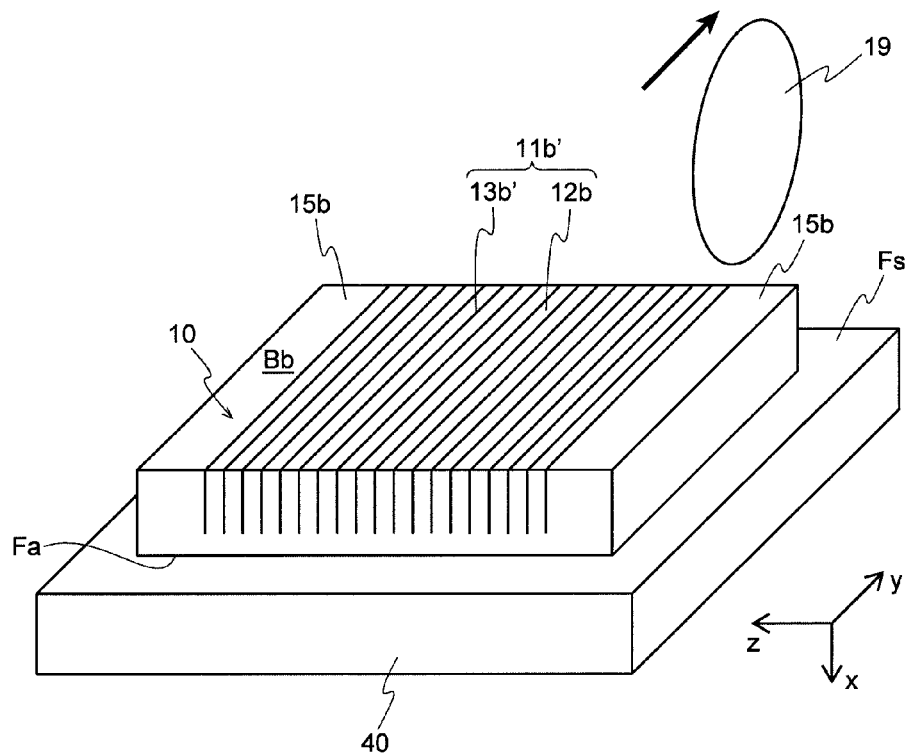
FIG. 25 is a perspective view showing the production of a comb-shaped GOS substrate by forming unpenetrating grooves in a GOS substrate fixed to a support plate, according to a still further embodiment of the present invention.

As shown in FIG. 25, the GOS substrate 10 is fixed on the second support plate 40 via an adhesive (not shown), and pluralities of parallel grooves 13b' as deep as not reaching the adhesive are formed on the GOS substrate 10 by a rotating cutting grinder 19, with both end portions 15b, 15b ungrooved. The formation of grooves 13b' provides a comb-shaped GOS substrate 11b' comprising pluralities of parallel GOS bars 12b, and connecting portions of the GOS bars 12b. The width and pitch of the GOS bars 12b are the same as those of the YGAG bars 2b. Both end portions 15b, 15b of the comb-shaped GOS substrate 11b' are cut off in a subsequent step A9 or A12.

Figure 26:
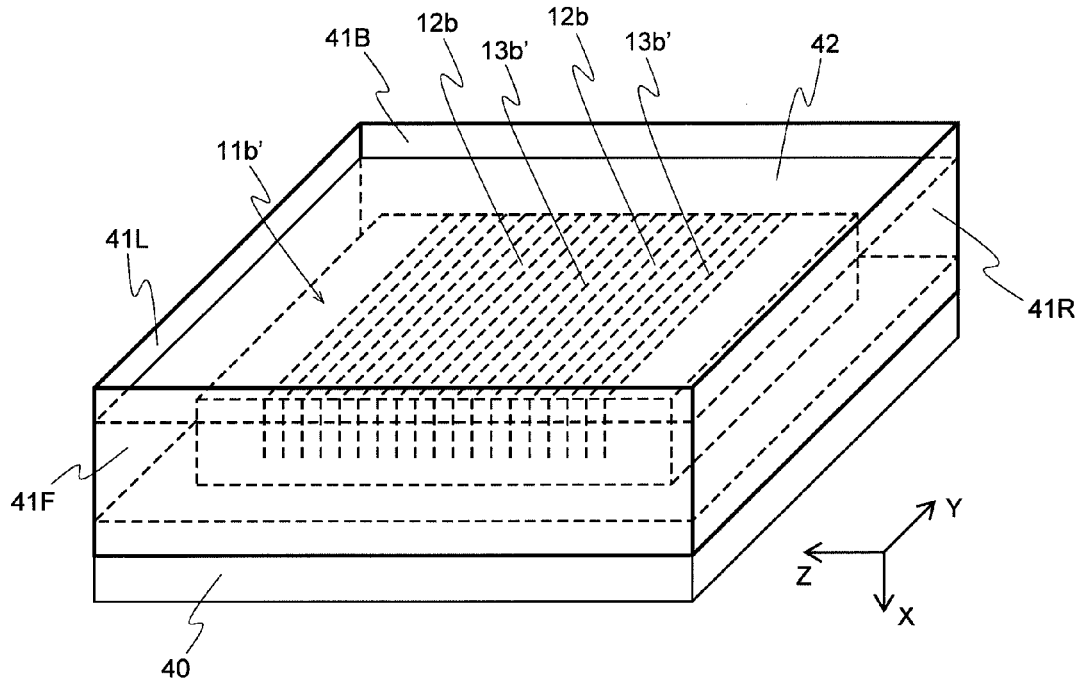
FIG. 26 is a perspective view showing the coating of a comb-shaped GOS substrate having unpenetrating grooves with a resin.

As shown in FIG. 26, films 41F, 41R, 41B, 41L for storing a liquid hardening resin are attached to side surfaces of the second support plate 40, to form a space for storing the liquid hardening resin 42. The liquid hardening resin 42 poured into the space fill the grooves of the comb-shaped GOS substrate 11b'. The hardening of the liquid hardening resin 42 makes pluralities of GOS bars 12b integral with the hardened resin 42'.

Figure 27A:
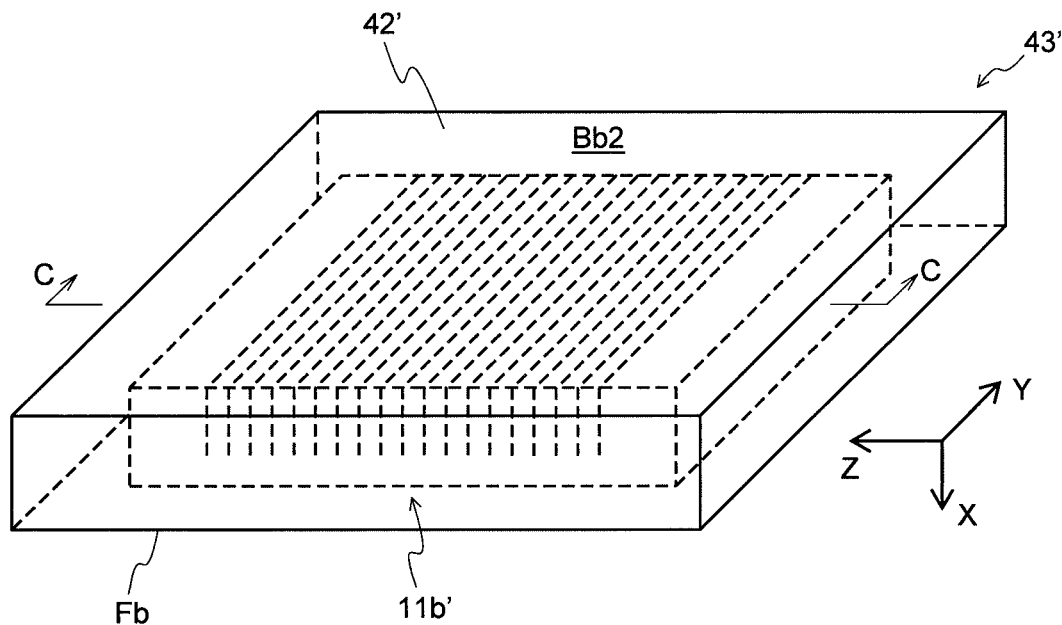
FIG. 27(a) is a perspective view showing a resin-hardened, comb-shaped GOS substrate according to a still further embodiment of the present invention.
Figure 27B:
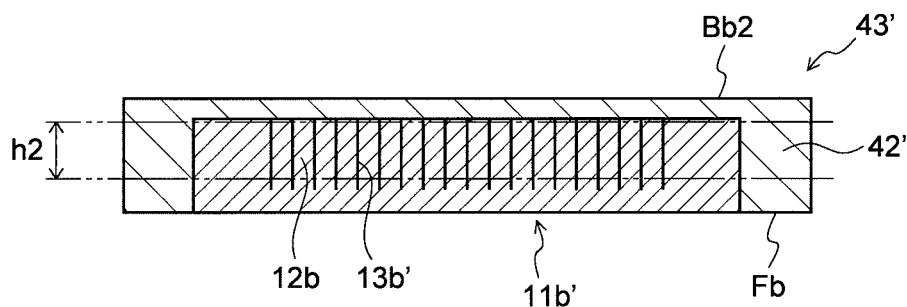
FIG. 27(b) is a cross-sectional view taken along the line C-C in FIG. 27(a).

As shown in FIGS. 27(a) and 27(b), a resin-hardened, comb-shaped GOS substrate 43', in which the comb-shaped GOS substrate 11b' is integral with the hardened resin 42', is obtained by removing the films 41F, 41R, 41B, 41L and the second support plate 40. As shown in FIG. 27(b), the front and rear surfaces Fb, Bb2 of the resin-hardened, comb-shaped GOS substrate 43' are ground, to remove the connecting portions of the comb-shaped GOS substrate 11b', and to expose both surfaces of the GOS bars 12c as shown in FIG. 10, thereby providing a GOS bar array 16c having a uniform thickness h2.

The present invention will be explained in further detail by Examples below, without intention of restricting the present invention thereto.

Example 1

Using the method of the first embodiment, A dual array shown in FIG. 21 was produced by a sintered YGAG substrate having a composition of $(Y_{0.8}Gd_{0.2}Ce_{0.003})_{3.0}(Ga_{0.5}Al_{0.5})_{5.0}O_{12}$, and a sintered GOS substrate having a composition of $(Gd_{0.999}Pr_{0.001}Ce_{0.00001})_2O_2S$, under the following conditions. Used as the first and second support plates were glass plates. A heat-sensitive, double-coated adhesive film was used as an adhesive, and round stainless steel rods were used as pins inserted into positioning grooves. An epoxy resin containing white rutile-type titanium oxide powder was used as a reflecting resin. A diamond grinder was used as a rotating grinder. The method of the first embodiment was more efficient with higher precision in the arrangement of YGAG cells 2d and GOS cells 12d than the method for producing a dual array by combining first and second scintillators one by one, which is described in JP 9-211139 A.

Effect of the Invention

The method of the present invention can efficiently produce scintillator dual arrays for constituting radiation detectors used in medical CT apparatuses, baggage-inspecting CT apparatuses, etc. with high precision.

What is claimed is:

1. A method for producing a scintillator dual array comprising the steps of
    bonding a first scintillator bar array comprising a plurality of first scintillator bars arranged via parallel grooves and a hardened reflecting resin filling said grooves, to a second scintillator bar array comprising a plurality of second scintillator bars arranged via parallel grooves and a hardened reflecting resin filling said grooves, via a light-reflecting, intermediate resin layer, thereby aligning both scintillator bar arrays in a lamination direction such that both scintillator bars are arranged in the same direction, and forming an integrally bonded bar array;
    cutting the integrally bonded bar array in an arranging direction of said first and second scintillator bars to form a plurality of bonded bar array pieces; and
    coating one cut surface of each of said bonded bar array pieces with a reflecting resin;
    said first and second scintillator bars having the same pitch; and
    said first and second scintillator bars having different sensitivity distributions of X-ray energy detection.

2. The method for producing a scintillator dual array according to claim 1, wherein said first and second scintillator bar arrays are bonded after said intermediate resin layer is provided on either one of them.

3. The method for producing a scintillator dual array according to claim 2, wherein said intermediate resin layer is formed on one of said scintillator bar arrays by (a) a method of forming a frame surrounding a region for said intermediate layer, pouring a liquid hardening resin for the intermediate layer into said frame, and grinding the hardened resin to predetermined thickness, (b) a method of forming a photoresist pattern surrounding a region for said intermediate layer by photolithography, pouring a liquid hardening resin into said photoresist pattern, and grinding the hardened resin to predetermined thickness, or (c) a method of bonding a hard resin plate having a predetermined thickness for said intermediate layer.

4. The method for producing a scintillator dual array according to claim 1, wherein said first scintillator bar array is formed by forming a plurality of parallel grooves in a first scintillator substrate fixed to a support plate, filling said grooves with a light-reflecting, hardening resin, and grinding said first scintillator substrate to a predetermined thickness; and wherein said second scintillator bar array is formed by forming a plurality of parallel grooves in a second scintillator substrate fixed to a support plate, filling said grooves with a light-reflecting, hardening resin, and grinding said second scintillator substrate to a predetermined thickness.

5. The method for producing a scintillator dual array according to claim 1, wherein both scintillator bar arrays are aligned in a lamination direction by forming positioning grooves in both scintillator bar arrays, inserting pins into the positioning grooves of either lower one of said first and second scintillator bar arrays, and laminating the other scintillator bar array on the lower scintillator bar array, with said pins received in the positioning grooves of the other scintillator bar array.

6. The method for producing a scintillator dual array according to claim 1, wherein a plurality of said bonded bar array pieces are placed on a support plate with equal gaps and are coated with a liquid hardening resin, said resin is hardened to form a dual array assembly, and said dual array assembly is cut along resin layers between said bonded bar array pieces to obtain individual scintillator dual arrays.

7. The method for producing a scintillator dual array according to claim 1,
    wherein said first scintillator bar array is formed by fixing a first scintillator substrate to a support plate, providing said first scintillator substrate with a plurality of parallel grooves as deep as its thickness, coating said first scintillator substrate having penetrating grooves with a liquid hardening resin filling said penetrating grooves, hardening said resin to form a first resin-hardened, grooved scintillator substrate, and grinding said first resin-hardened, grooved scintillator substrate to desired thickness; and
    wherein said second scintillator bar array is formed by fixing a second scintillator substrate to a support plate, providing said second scintillator substrate with a plurality of parallel grooves as deep as its thickness, coating said second scintillator substrate having penetrating grooves with a liquid hardening resin filling said penetrating grooves, hardening said resin to form a second resin-hardened, grooved scintillator substrate, and grinding said second resin-hardened, grooved scintillator substrate to desired thickness.

8. The method for producing a scintillator dual array according to claim 1,
wherein said first scintillator bar array is formed by fixing a first scintillator substrate to a support plate, providing said first scintillator substrate with a plurality of parallel grooves shallower than its thickness to form a first comb-shaped scintillator substrate comprising a plurality of parallel scintillator bars integral via connecting portions, coating said first comb-shaped scintillator substrate with a liquid hardening resin filling said grooves, hardening said resin to form a first resin-hardened, comb-shaped scintillator substrate, and grinding said first resin-hardened, comb-shaped scintillator substrate to desired thickness such that said connecting portions are removed; and
wherein said second scintillator bar array is formed by fixing a second scintillator substrate to a support plate, providing said second scintillator substrate with a plurality of parallel grooves shallower than its thickness to form a second comb-shaped scintillator substrate comprising a plurality of parallel scintillator bars integral via connecting portions, coating said second comb-shaped scintillator substrate with a liquid hardening resin filling said grooves, hardening said resin to form a second resin-hardened, comb-shaped scintillator substrate, and grinding said second resin-hardened, comb-shaped scintillator substrate to desired thickness such that said connecting portions are removed.

9. The method for producing a scintillator dual array according to claim 1, wherein said first scintillator bar array is a YGAG scintillator bar array or a ZnSe scintillator bar array, and said second scintillator bar array is a GOS scintillator bar array or a GGAG scintillator bar array.

10. The method for producing a scintillator dual array according to claim 9, wherein said first scintillator bar array is a YGAG scintillator bar array, and said second scintillator bar array is a GOS scintillator bar array.

11. The method for producing a scintillator dual array according to claim 9, wherein said first scintillator bar array is a YGAG scintillator bar array, and said second scintillator bar array is a GGAG scintillator bar array.

12. The method for producing a scintillator dual array according to claim 9, wherein said first scintillator bar array is a ZnSe scintillator bar array, and said second scintillator bar array is a GGAG scintillator bar array.

* * * * *